Figure 1:
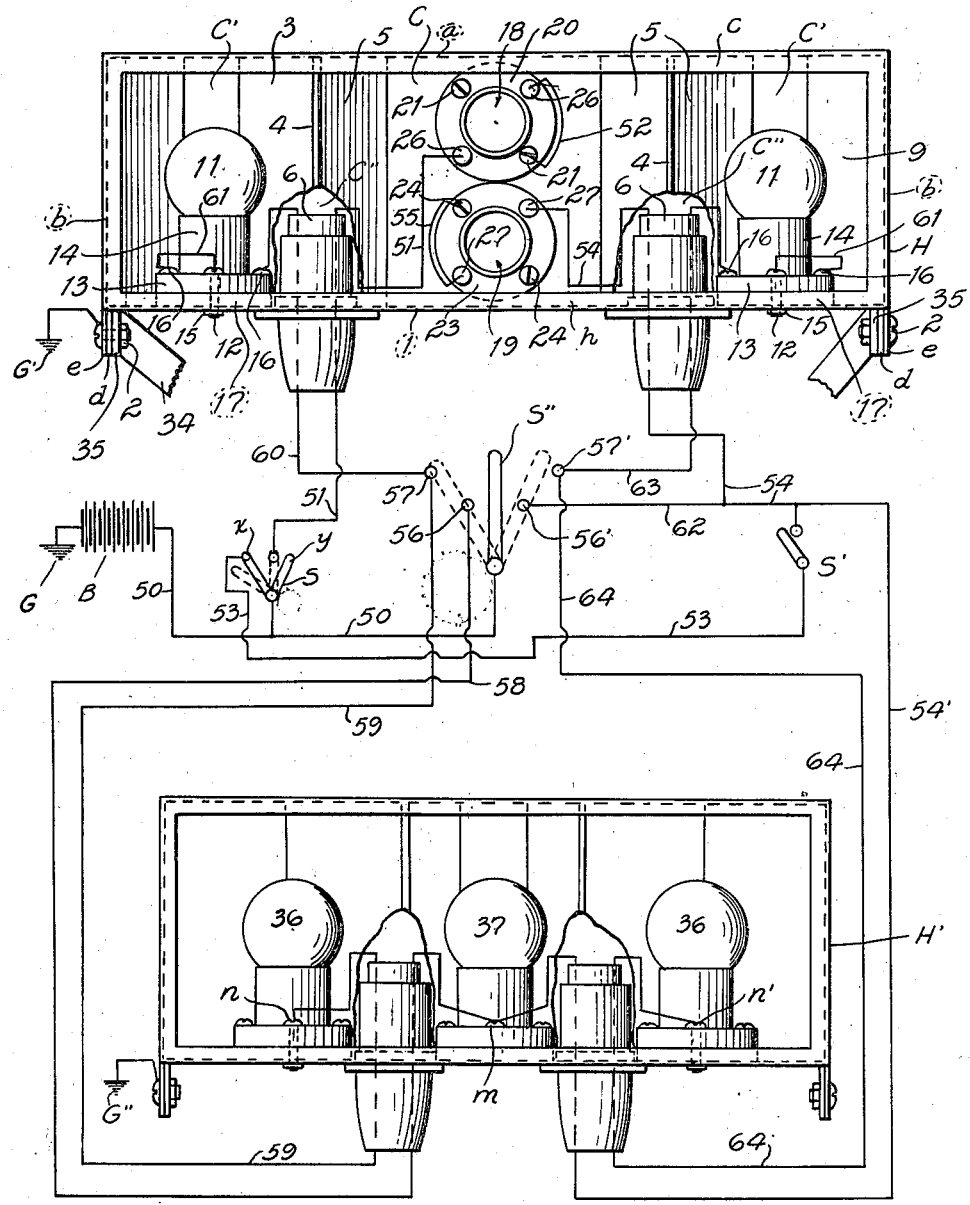

Aug. 5, 1924.

1,503,503

J. JAMETON

AUTOMOBILE SIGNAL

Filed Feb. 25, 1922  2 Sheets-Sheet 1

Inventor:
Julius Jameton.

By Harry A. Beimer
Attorney.

Aug. 5, 1924.
J. JAMETON
1,503,503
AUTOMOBILE SIGNAL
Filed Feb. 25, 1922  2 Sheets-Sheet 2
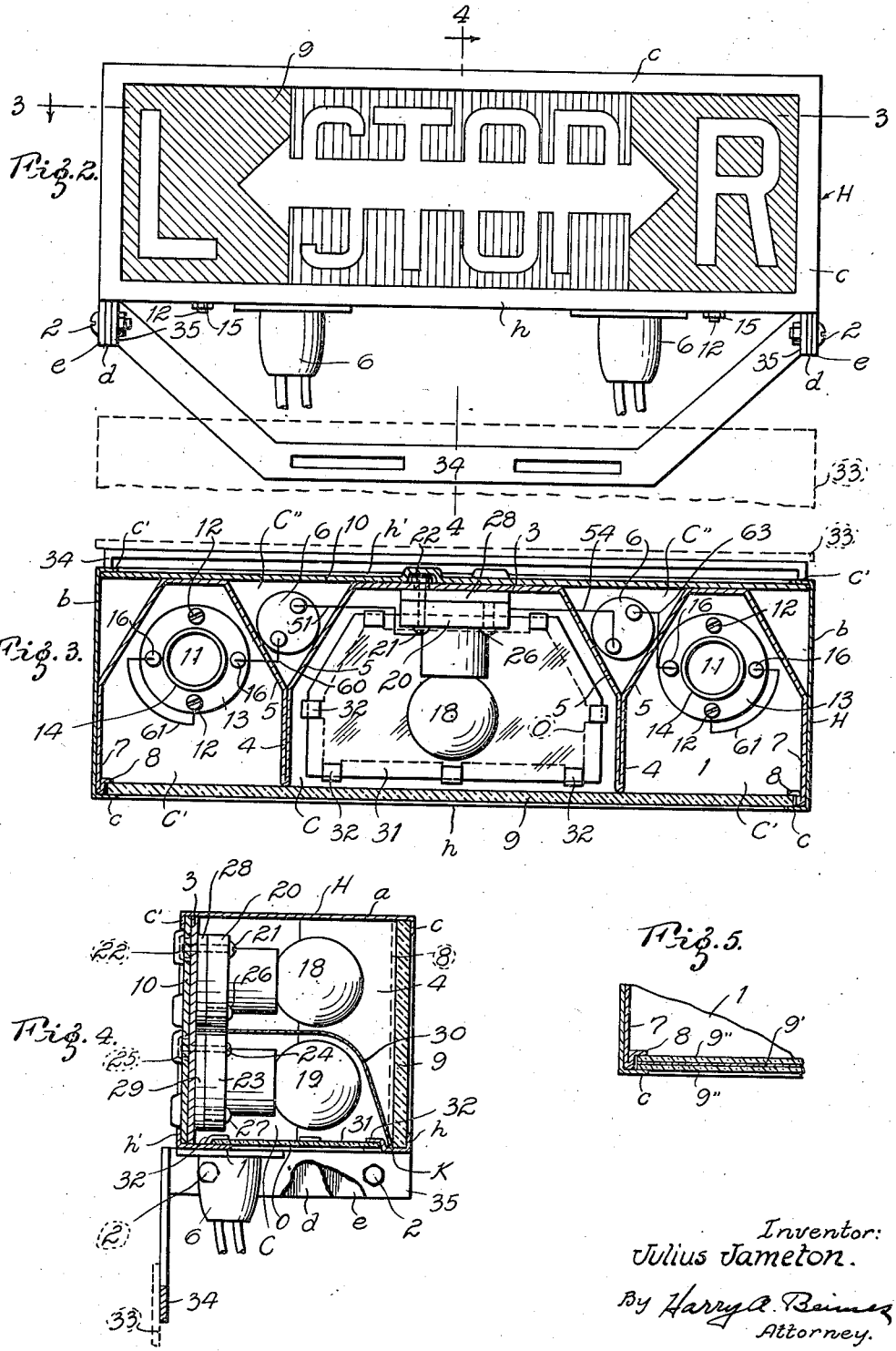
Inventor:
Julius Jameton.
By Harry A. Beimes
Attorney.

Patented Aug. 5, 1924.

1,503,503

UNITED STATES PATENT OFFICE.

JULIUS JAMETON, OF ST. LOUIS, MISSOURI.

AUTOMOBILE SIGNAL.

Application filed February 25, 1922. Serial No. 539,172.

*To all whom it may concern:*

Be it known that I, JULIUS JAMETON, a citizen of the United States, residing at St. Louis, State of Missouri, have invented certain new and useful Improvements in Automobile Signals, of which the following is a specification.

My invention has relation to improvements in automobile signals, and consists in the novel features of construction more fully set forth in the specification and pointed out in the claim.

The object of the present invention is to provide a suitable signal device that will automatically give the required signal when the driver intends to stop or slow up, and one in which he may indicate a turn to the right or left, said signals being visible on the translucent wall of the signal housing which also carries the tail light, said housing being further provided with means for illuminating the license plate. A further object is to provide similar devices for the front and the rear of the automobile, the signal lights of the devices being connected in parallel so the driver's intention may be indicated to the front as well as to the rear of him. A further object is to provide a signal device that is simple, embodying standard electrical parts so that they may be readily replaced when required.

Further and other advantages will be better apparent from a detailed description of the invention in connection with the accompanying drawings, in which—

Figure 1 is an elevational view of the rear and the front signal housings with their translucent walls removed to show the signal lamps, the electrical connections and wiring of which are shown diagrammatically; Fig. 2 is a face view of the rear signal housing; Fig. 3 is a horizontal longitudinal section taken on the line 3—3 of Fig. 2; Fig. 4 is a vertical cross-section taken on the line 4—4 of Fig. 2; Fig. 5 is a fragmentary section of the housing showing a modified form of panel for the signal symbols.

Referring to the drawings, H represents the rear signal housing and H' the front signal housing which is made the subject of a separate application filed of even date herewith, and will not be described in detail.

The housing H is provided with a top wall $a$, and end walls $b, b$ formed integrally therewith, said walls having an inwardly turned flange $c$ at the rear, and a similar flange $c'$ at the front for a purpose to be presently shown. The housing H has a detachable bottom 1 provided with downwardly bent flanges $d, d$ at the ends whereby the bottom is secured to extensions $e, e$ of the end walls by bolts 2, 2. When the bottom 1 is secured in place the lower ends of flanges $c$ and $c'$ come into abutting relation with upstanding flanges $h, h'$ on the bottom, thus forming a continuous flange frame around both the front and back walls of the housing. A partition member 3 is bent from a single piece of metal having a reflecting surface on one side in such a manner as to provide partitions 4, 4 of double thickness which are separated respectively into their components 5, 5 at about their middle point, and the member 3 is placed within the housing H and rests on the bottom 1. The partitions 4, 4 and 5, 5, 5, 5 thus divide the housing into five compartments, the center compartment C being considerably larger than the end compartments C', C' while the intermediate triangular compartments C'', C'' are just large enough to receive each within them an inlet plug 6. The ends 7, 7 of the member 3 are folded back on themselves a short distance and terminate in inwardly bent flanges 8, 8 which are spaced a short distance from flange $c$, the inner surface of flanges 8, 8 being in line with the outer free end of partitions 4, 4. A space is thus provided between the flange 8 and flange $c$ into which is placed a glass panel 9 having suitable direction symbols marked on a green field opposite campartments C', C' and a stop (or slow) signal marked on a red field opposite compartment C. A wall 10 is inserted in the housing between the flanges $c', h'$ and the partition member 3 thus holding said member in place.

An electric lamp 11 is mounted in each compartment C', each of said lamps being secured to the bottom 1 by bolts 12, 12 traversing the flange 13 of the lamp socket 14, said bolts having nuts 15, 15 passed over their outer ends and bearing against the bottom 1. However, the contacts 16, 16 of each lamp are insulated from the bottom 1 by a block of insulation 17 interposed between the flange 13 and said bottom, said insulation 17 being traversed by the bolts 12, 12 of each lamp.

Two lamps 18 and 19 are mounted in the center compartment C, each of said lamps being secured to the inner face of the partition member 3, the flange 20 of lamp 18 and partition member being traversed by bolts 21, 21 secured by nuts 22, 22 and the flange 23 of lamp 19 and the partition member being traversed by bolts 24, 24 secured by nuts 25, 25. The contacts 26, 26 and contacts 27, 27 respectively of lamps 18 and 19 are insulated from the partition member 3 by insulation blocks 28, and 29 respectively, said blocks also being traversed by the bolts 21 and 24.

The compartment C is subdivided into two compartments by a colored (red) partition 30 which is interposed between lamps 18 and 19 and is curved downwardly so that its lower edge $k$ is heeled in at the bottom of the glass panel 9. Consequently any light from the lamp 19 that passes through this partition 30 will be red, and will not show as brightly through the glass 9 as the light from the lamp 18. The reason for this is that the lamp 19 furnishes the tail-light for the auto while the light from the lamp 18 gives the stop signal as will hereinafter appear.

Referring to this panel 9 on which are marked the stop and direction symbols this need not be a single glass panel, but, if desired, the symbols may be marked on a celluloid or isinglass panel 9′ (see Fig. 5) confined between thin panes of ordinary clear window glass 9″, 9″. In this instance, if the glass should be accidentally broken, the panel containing the symbols could still be used for a limited time until a new pane of glass could be procured.

The bottom 1 is provided with an opening O within the compartment C substantially the shape of and somewhat smaller than said compartment, said opening being covered with a glass 31 held in place by fingers 32 bent upwardly from the edge of the opening and bearing on the glass, the object of which is to permit light rays from lamp 19 to pass downwardly out of the compartment and illuminate the face of a license plate 33 which may be mounted on a U-shaped bracket 34, the side arms 35 of which are bolted to the flanges $d$, $d$ of the bottom by the bolts 2, 2 which secure said flanges to extensions $e$, $e$ of the sides $b$, $b$ of the housing H.

The housing H′ is provided with signal lamps 36, 36 and 37 connected by suitable parallel circuits about to be described, with lamps 11, 11 and 19 respectively of housing H.

B represents a battery (or other source of electric energy), S a switch adapted to be operated by the brake pedal (not shown), S″ a switch for controlling the direction signals, and S′ a dash switch for closing the tail-light circuit. The battery B is grounded at G, the housing H at G′, and housing H′ at G″. The circuits may now be traced as follows: Let us consider first the circuit of stop lamp 18. From the battery B through conductor 50 to the pivot of switch S (which has two arms $x$ and $y$) arm $y$, normally out of contact with conductor 51 but moved into contact therewith (dotted) when the brake pedal is depressed, conductor 51 to one contact 26 of lamp 18 through the lamp to the other contact 26, to bolt 21 by conductor 52 and grounded on the housing. Thus when the brake is applied the switch S is moved to close this circuit and light the lamp 18 giving the stop signal.

The circuit of the tail-lamp 19 may be traced.—From the battery B through conductor 50 to the pivot of switch S through the arm $x$, normally in contact with conductor 53, through said conductor to dash-switch S′ (closed at night) to conductors 54 and 54′ from conductor 54 to one contact 27 of the lamp 19, through lamp, other contact 27 to bolt 24 by conductor 55 being grounded on the housing by said bolt. Conductor 54′ leads to one contact of the parking lamp 37 which is also grounded to the housing. Hence when switch S′ is closed both tail-lamp 19 and parking lamp 37 are lighted. However, when the brake is applied and the stop signal given by swinging switch S to the dotted position, the tail-light circuit will be broken, the object of which is to prevent a drain on the battery by having both lamps 18 and 19 lighted as the light from lamp 19 is not needed when the stop-lamp 18 is lighted. The parking-light will also be extinguished when the tail-light circuit is broken on applying the brake, the object of which is to attract attention, as the parking-light in the front may be caused to blink with alternate pressure on and release of the brake pedal.

The circuits of the direction signal-lamps 11, 11 in rear housing H, and 36, 36 in front housing H′, may be considered together.— From battery B to oscillatable switch S″ through conductor 50; now assuming that switch S″ is swung to the left to indicate a left turn, it will first contact with contact 56 and with a further movement with contact 57; from contact 56 conductor 58 leads to contact $m$ of lamp 37, the other being grounded, which causes said lamp to light and conductor 54′ also leads from contact $n$ and connects with conductor 54, which, as we have already seen, closes the circuit of lamp 19 and lights the tail-light. Now conductors 59 and 60 lead from contact 57, the former to contact 16 of left-hand lamp 11 and the latter to contact $n$ of left-hand lamp 36. Lamp 11 is grounded by a conductor 61 which connects contact 16 to bolt 12, and lamp 36 is likewise grounded so that both lamps on the left hand side will be lighted as well as the tail-light and parking-light i not already lighted. Consequently, even in the day-time, when the tail-light and parking-light are not lighted, they will be so when giving a direction signal, so that a red light will show in the center of housings H, H' and a green light on the side the driver intends to turn to. When the driver intends to turn to the right, he will throw switch S" to the right, making successive contact with contacts 56', 57', and closing the tail-light and parking-light circuits by connecting conductors 54 and 54' with conductor 50 by the switch and conductor 62, and closing the right-hand direction lamp circuits by conductors 63 and 64, the former leading to contact 16 of right-hand lamp 11, said lamp being grounded similarly to the left-hand lamp 11, and the latter leading to contact n' of right-hand lamp 36 also grounded.

From the foregoing it will be apparent that on giving a direction signal the stop signal will also be given, although the stop signal may be given independently, and the tail-light and parking lamps may also be lighted independently of the direction signals.

Obviously the invention is susceptible to modifications in the housings and wiring without departing from the spirit of the same.

Having described my invention, I claim:

A signal device for automobiles comprising a housing having a detachable bottom, a partition member in said housing, said member being bent so as to divide the housing into three compartments, a pair of lamps in the center compartment, said lamps being mounted on the partition member, a lamp in each outer compartment, a translucent panel in one wall of the housing, and a colored partition interposed between one lamp in the center compartment and the translucent panel.

In testimony whereof I hereunto affix my signature.

JULIUS JAMETON.